Figure 1:
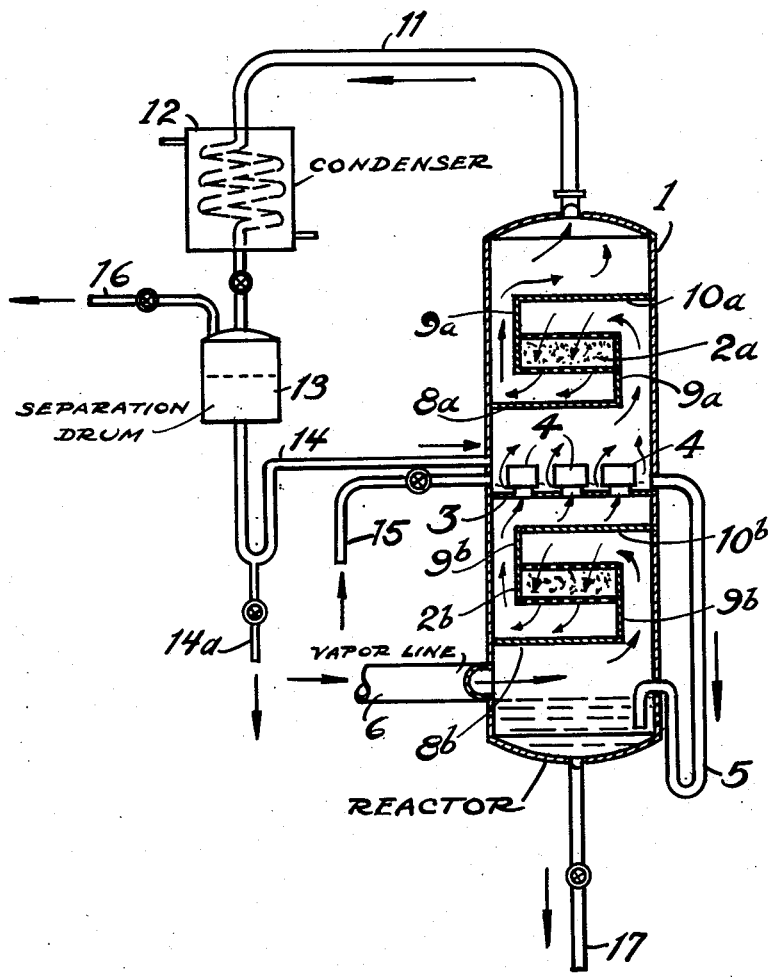

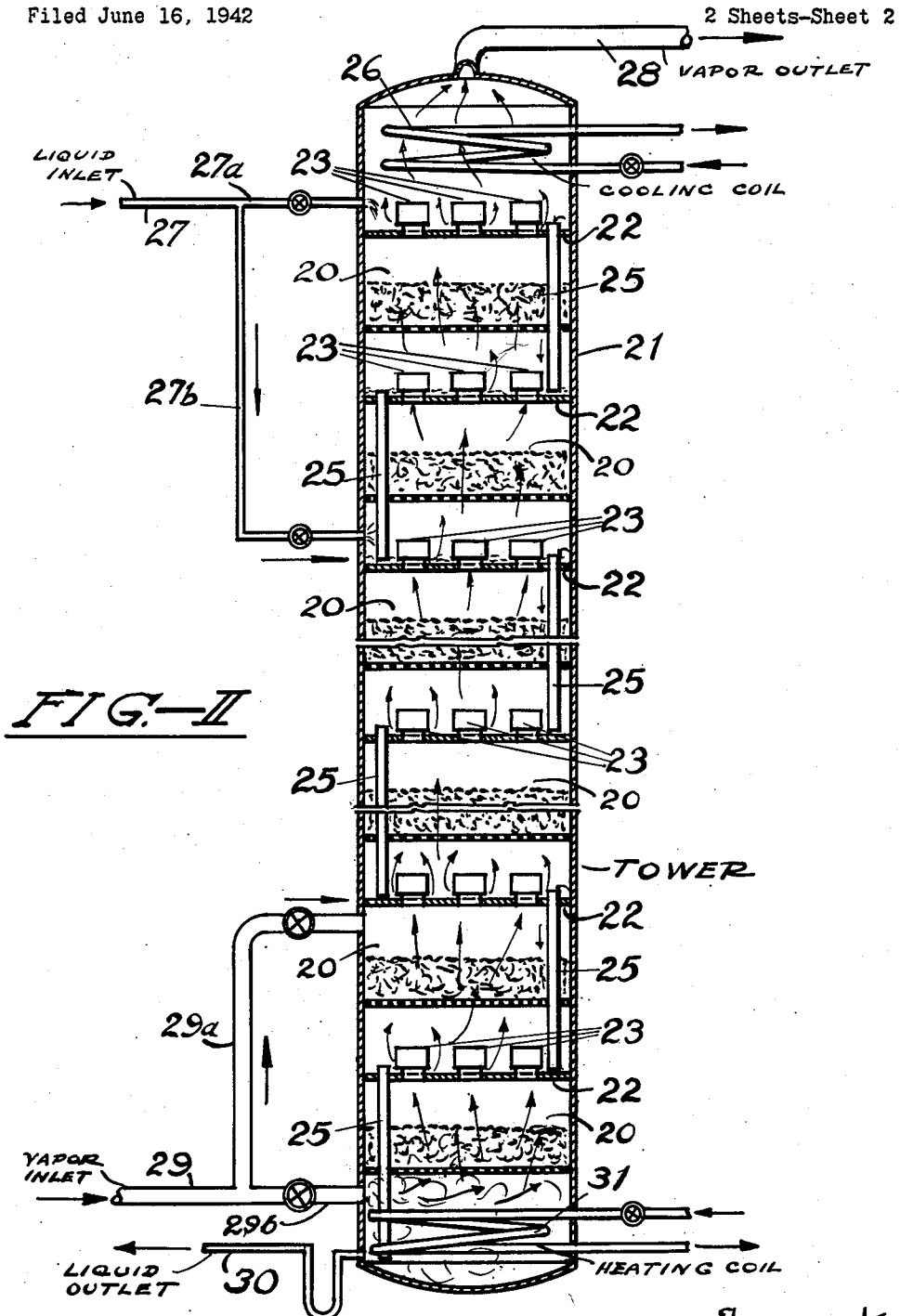

Patented Apr. 27, 1954

2,676,875

UNITED STATES PATENT OFFICE 2,676,875

CATALYTIC APPARATUS FOR ISOTOPE EXCHANGE

Frank T. Barr, Summit, N. J., assignor, by mesne assignments, to the United States of America as represented by the United States Atomic Energy Commission Application June 16, 1942, Serial No. 447,245

4 Claims. (Cl. 23—288)

1

The present invention relates to an improved catalytic reaction vessel and to a process for bringing reaction materials together under the influence of a catalyst, and more specifically to a reaction chamber adapted for reaction between gaseous reactants, especially where the equilibrium constant of the reaction is relatively unfavorable. The invention will be understood from the following description and drawings.

In the drawings, Fig. 1 is a semi-diagrammatic view in sectional elevation of the reaction vessel in its simplest form, showing the passage of materials therethru, and Fig. 2 is a similar view of a more complicated apparatus working on the same principles.

There are many reactions which occur between vapors where it is desirable that the reactants flow in counter-current contact but this, in so far as is now known, has not been accomplished previously. In some of these reactions there is an added complication due to the fact that the reaction equilibrium constant is quite unfavorable to the reaction desired so that conversion per pass is quite small. The previous solution of the latter difficulty has been the recirculation of the unconverted reactants after the product has been removed, but it will be understood that in many cases this involves high pumping costs, expensive separation procedures and loss of heat due to heating and cooling of the reactants.

One object of the present invention is to provide a means for causing reaction vapors to pass in countercurrent flow. Another object is to provide a reaction vessel suitable for gaseous reactions where the conversion per pass must be low so as to avoid high recirculation rates and the other disadvantages heretofore inherent in such reactions. Other objects and advantages of the present apparatus will be apparent to those skilled in the art.

Referring to the drawings, in Fig. 1 there is shown a reactor shell 1 which is preferably in vertical form and adapted to withstand the conditions of the reaction, for example the pressure that may be necessary as well as the temperature and corrosive action of reactants or products. Two bodies or beds of catalytic material designated by numeral 2a and 2b are shown in the shell, located one above the other. Vapors rising through the shell must pass in contact with the materials making up the two catalyst beds. The nature of the particular catalyst need not be discussed at this point since the apparatus is for general use and particular catalysts will, of course, be chosen for the particular reactions.

2

The catalysts may be in the form of lumps, pelleted powders or extruded shapes and is supported on trays or screens, the details of which are not completely shown. Between the catalyst beds there is placed a plate 3 which is shown fitted with bell caps 4 or similar devices such as are ordinarily employed in fractionating towers and which serve the purpose of bringing liquid and vapor in contact with each other. An overflow pipe 5 is also provided in connection with the bubble cap plate to cary off liquid accumulated on the plate and it will be noted that the pipe 5 passes around the catalyst bed 2b below the plate so that the liquid will be conducted out of contact with the catalyst and will be discharged in the lower part of the shell. The lower end of the overflow pipe should, of course, be sealed below the liquid level in the lower part of the shell so as to prevent upward passage of gas or vapors. The vapor is fed into the shell by a vapor pipe 6 at the lower end of the shell and it will be noted that the vapor then passes upwardly through the tower first through lower catalyst bed 2b and then through the vapor contact zone 3 before it passes through the upper catalyst bed 2a. The actual flow through the catalyst beds is downward, which permits high velocity especially with catalysts in fine particles. Partition plates 8a, 9a and 10a, 8b, 9b and 10b respectively associated with catalyst beds 2a and 2b respectively are provided to direct the flow of vapor within the tower. The vapor finds exit through a pipe 11, communicating with a condenser 12 and a separation drum 13. The liquid collected in drum 13 may be returned to the bell cap plate 3, if desired, by means of a trapped line 14 and liquid may also be introduced on to the plate by means of a valved feed pipe 15, if desired. Part or all of the condensed liquid may be withdrawn from the separation drum 13 by pipe 14a. Gases from the separation drum 13 are withdrawn by vapor pipe 16. It will thus be seen that liquid is discharged on the contact plate 3 where it comes in contact with the vapors rising from the lower catalyst bed 2b and after such contact the liquid is passed out of contact with the lower catalyst bed 2b to the bottom of the shell where it may be brought into contact with the entering vapors as desired. In any case, the liquid is withdrawn from the bottom of the shell by pipe 17.

The operation of the above mentioned apparatus can be readily understood from the description given before. The important point is that the vapors will be seen to pass upwardly through two catalyst beds and that between the catalyst beds it is brought into contact with a liquid on the plate 3. The liquid fed to the plate is at no time permitted to contact the catalytic material. The liquid may be a condensate from the effluent gases or it may be an extraneous liquid merely fed into the zone for contact purposes. It will be understood that in either case the purpose of the plate is to permit a contact of liquid and vapor after an initial catalytic reaction stage so that the product, or a substantial portion of it at least, is removed from the reactant vapors prior to a secondary catalytic contact in the upper reaction zone. The vapor-liquid interchange taking place on the plate 3 may be merely a solution of the product in a suitable solvent. The solution of the product, however, may involve a liberation of heat which is capable of releasing dissolved reactants which thus pass upward to the upper reaction stage.

It will be understood that the reaction vessel may be protected from loss of heat by suitable packing, not shown, or it actually may be heated by a suitable jacket or heating coils within the shell. These coils may be adapted for passage of steam or other heating medium and are particularly to be desired where the reaction involves a large absorption of heat. Similarly cooling coils may be provided in the reaction zone if the reaction evolves any substantial amount of heat.

In the second figure, the shell is shown as a tall tower 21. It is fitted alternately with bell cap plates 22 and catalytic zones 20. The plates, as indicated above, are fitted with bell caps 23 and overflow pipes 25 which carry liquids from upper plates to lower plates out of contact, however, with the catalytic zones therebetween. In this drawing, the overflow pipes are shown inside of the tower, but it will be understood that they can be placed outside the tower, thus providing the entire tower cross-section for the catalyst bed. A cooling coil 26 may be provided in the upper end of the tower to provide a reflux and it will be noted that the reflux passes down the tower from bell cap plate 22 to its successor bell cap plate below, but out of contact with the catalyst. If desired, liquid may be added to the top of the tower through the pipe 27 with branches 27a and 27b which discharge respectively on the upper plate of the tower and a few plates below. The vapor products pass from the upper end of the tower by a pipe 28, from which the final product may be obtained. Vaporous reactants are added to the tower through a vapor pipe 29 which has branches 29a and 29b. The first of these enters the tower at an intermediate point along its length a few plates above the bottom while the pipe 29b connects directly into the lower portion of the tower. These vapor pipes may be used alternatively and suitable valves are provided for controlling the flow. If it is desired to strip the liquid flowing down the tower of the reactants before withdrawal, it is better to use pipe 29a rather than 29b, but in some instances this is not of particular importance. A pipe 30 is provided at the bottom of the tower for withdrawing the liquid and a heating coil 31 may also be provided in the bottom of the tower for causing a reboiling of the liquid in the lower part of the shell.

It will be understood that, as in the case with the apparatus shown in Fig. 1, this tower is to be constructed of materials adapted for the particular reaction. It may be operated at low pressure or at high pressure and must be designed for the particular reaction. Similarly, the catalyst placed on the several plates must be adapted for the particular reaction carried out and may be in any suitable form whether pilled, extruded or in lumps. Again the tower may be heated at the bottom as indicated above by the coil 31 and if desired additional heating coils may be placed on the several lower plates within the tower in order to effect a more complete stripping. In the same manner, the cooling of the tower is preferably carried out by means of the reflux coil 26 but if desired a total condenser can be used with return of a portion of the condensate as reflux. Additional heating and cooling elements may be distributed up and down the tower as indicated before, either as jackets or coils within the tower.

The reaction vessels described above may be used for many different reactions, for example for the production of esters of low boiling alcohols and acids. In such a case, the acid and alcohol are vaporized and the mixed vapor is passed into the tower or reactor, preferably at the intermediate point. The cooling coil, such as used in Fig. 2, is adapted to reflux most of the reactants and to permit passage of the steam produced in the reaction. Inert gas which is preferably fed along with the reacting vapors will also pass overhead. As the vapors pass through the esterifying catalyst, the ester is formed in the vapor phase. Vapors then bubble up through the liquid on the contact plates and the ester is condensed giving up its heat of vaporization and thereby evaporating alcohol and acid. It will be noted that the ester is thus removed from the vapors after passage through each catalyst bed and the vapors are thus ready for a succeeding stage of conversion which can proceed substantially unaffected by the presence of the ester which has been formed in the previous stages. The liquid flowing down the tower and which, of course, is rich in ester does not come in contact with the catalyst and is thus withdrawn from the zones in which reaction takes place. It is, however, necessary to wash the reaction product from the vapors after each stage so as to remove the product.

In effect, it will be seen that the ester is rapidly removed from the reaction zones, permitting the further reaction without the necessity for recirculation. If desired, an oil or other ester solvent may be added at the top of the tower and as it moves down the tower it will remove the ester as it passes through the absorption stages, but such solvent is not necessary since the ester is higher boiling than either the alcohol or the acid and it should thus serve as its own solvent.

In another variant of the method, a higher boiling acid is introduced as a liquid into the top of the tower while a lower boiling alcohol as vapor at the bottom. As the acid washes down the tower, it will be vaporized gradually so as to pass upward through the catalyst with the alcohol vapors. The ester formed is condensed out and washes down the tower. If the alcohol is higher boiling than the acid, the alcohol will be added at the top as liquid and the acid as vapor at the bottom.

Another reaction which can be carried out in the present reactors is the synthesis of ammonia. In this case the reacting gases are hydrogen and nitrogen and the process as usual is carried out under heavy pressure. These gases may be added at the bottom of the tower and a solvent such as water is passed into the top of the tower.

The reaction has a very unfavorable reaction constant which permits only small yields per pass but by the present system the ammonia is periodically removed between short reaction stages and in this manner a high over-all yield is obtained without recirculation. The aqueous ammonia is removed from the base of the tower. This same system can be used for other similar syntheses, for example for the production of methanol or hydrocarbons by the reaction of CO and hydrogen and for many other reactions.

An important application of the present invention is in the separation of isotopes or compounds containing them by chemical reactions. To illustrate such a process several examples will be given.

In the production of heavy water, hydrogen is generated from water which, as will be understood, contains a small amount of deuterium oxide. To process may be electrolytic, thermal or catalytic. This gas is saturated with water vapor at say 60° or 70° C., under normal pressure, and the gases enter preferably at the bottom of the tower in Fig. 2. In passing through the catalyst, the free deuterium reacts with water vapor forming deuterium oxide and releasing free hydrogen. Water is passed into the top of the tower and hydrogen is withdrawn also from the top. As the water passes down the tower, it periodically washes the gases after each catalyst stage, keeping the water concentration of the gases at the saturation point under prevailing conditions and removing the heavy water formed by the process and replacing it with ordinary water vapor for further reaction. As the water passes downwardly through the tower, it will gradually become stripped of dissolved hydrogen and deuterium so that the material removed from the bottom of the tower is substantially free of such dissolved gases, and has a higher concentration of deuterium oxide than is present in normal water. This water may be withdrawn if it is of sufficiently high deuterium oxide content for the purpose in hand, otherwise it may be returned to a hydrogen generation equipment of any desired type, for example electrolytic or catalytic, and the vapor is passed to the bottom of the tower again and again until the concentration of deuterium oxide in the withdrawn liquid is up to the desired concentration.

As a second illustration of the manufacture of heavy hydrogen, the present apparatus can be employed to bring about a reaction between a gaseous mixture of hydrogen and deuterium with liquefied ammonia. The system is the same as above except that ammonia is substituted for water and an ammonia containing more or less deuterium in place of hydrogen is withdrawn at the bottom.

In the same manner various other exchanges can be carried out for concentrating the heavier isotopes from their lighter counterparts.

In the above illustrations, it will be seen that the reaction vessel which is the subject of the present invention is capable of use for many different reactions. It is necessary for the reaction that the product with or without one of the reactants be capable of being readily converted into a liquid phase either by condensation or absorption in a suitable solvent and readily capable of being resolved into the vapor phase again. This naturally places some practical limitation on the uses to which the reactor may be placed but by suitable adjustment of temperature and pressure, it is frequently possible to bring the reaction conditions within the posible operation of the tower. It will be understood that there are certain reactions occurring at very high temperatures where the difference between the reaction temperature and the condensation or absorption temperature is too great to permit successful operation. Nevertheless, as indicated above, the reaction vessel may be used for a variety of different reactions.

It will be understood that variations may be made in the apparatus shown without sensibly departing from the present invention. For example, various types of bubble cap plates can be used or, if desired, packed sections can be employed instead of the bubble cap plates. Care should be exercised, however, to provide liquid collecting pans or other devices underneath the packed sections so as to prevent dropping of an excessive amount of liquid back into the catalyst. On the drawings there has been shown a single vapor-liquid contact zone, that is a single plate between catalytic beds, but it will be understood that more than one plate can be placed between each pair of beds if desired and additional liquid may be added to the several plates as desired. Furthermore, the liquid delivered from each plate may be heated or cooled before it is discharged on the plate below so as to increase or decrease the effective amount of reflux without changing the actual volume of liquid flowing down the tower. The catalyst beds may be arranged for downward passage of vapors in order to prevent blowing the catalyst off of their support and various extraction devices may be fitted above the bubble cap plates.

The present invention is not to be limited to any theory of the operation of the tower nor to any particular mechanical arrangement of the plates, catalytic zones, the particular vapor liquid contact methods, overflow and the like, but only to the following claims in which it is desired to claim all novelty inherent in the invention as broadly as the prior art permits.

I claim:

1. Apparatus for effecting the exchange of isotopic species between a vapor of a liquid and a gas comprising an elongated shell, separate means for introducing said liquid into one end of said shell and for withdrawing from the other end thereof liquid enriched in the desired isotope, separate means for introducing said gas at the liquid withdrawal end of said shell and for withdrawing at the liquid introduction end of said shell gas impoverished in said desired isotope, a plurality of catalyst beds positioned in spaced relation in the path of the gas through said shell, vapor-liquid contacting means disposed between successive catalyst beds, said catalyst beds being positioned out of contact with the path of the liquid through said shell, conduits coacting with vapor liquid contacting means to establish a continuous passageway for liquid throughout the shell, said conduits defining a bypass through said beds whereby said catalyst remains out of contact with said liquid, and means in said shell remote from said liquid introducing means for vaporizing liquid.

2. Apparatus for effecting the exchange of isotopic species between a vapor of a liquid and a gas comprising an elongated shell, separate means for introducing said liquid into one end of said shell and for withdrawing from the other end thereof liquid enriched in the desired isotope, separate means for introducing said gas at the liquid withdrawal end of said shell and for withdrawing at the liquid introduction end of said shell gas impoverished in said desired isotope, a catalyst bed positioned in the path of the gas through the shell, said catalyst bed being positioned out of contact with the path of the liquid through said shell, vapor-liquid contacting means disposed intermediate the liquid inlet and the catalyst bed, heating means between said catalyst bed and liquid outlet, and bypass conduit coacting with said vapor-liquid contacting means to establish a passageway from said liquid inlet to said heating means, said conduit defining a bypass through said catalyst bed, whereby said catalyst remains out of contact with said liquid.

3. Apparatus for effecting the exchange of isotopic species between a vapor of a liquid and a gas comprising an elongated shell, separate means for introducing said liquid into one end of said shell and for withdrawing from the other end thereof liquid enriched in the desired isotope, separate means for introducing said gas at the liquid withdrawal end of said shell and for withdrawing at the liquid introduction end of said shell gas impoverished in said desired isotope, a plurality of catalyst beds positioned in spaced relation in the path of the gas through said shell, bubble plates disposed between successive catalyst beds, conduits coacting with said bubble plates to establish a continuous passageway for liquid throughout the shell, said conduits defining a bypass through said beds, whereby said catalyst remains out of contact with said liquid, and means in said shell remote from said liquid introducing means for vaporizing liquids.

4. Apparatus for effecting the exchange of isotopic species between a vapor of a liquid and a gas comprising a vertical shell, separate means for introducing said liquid into the upper end of said shell and for withdrawing from the lower end thereof liquid enriched in the desired isotope, separate means for introducing said gas at the liquid withdrawal end of said shell and for withdrawing at the liquid introduction end of said shell gas impoverished in said desired isotope, a plurality of catalyst beds positioned in spaced relation in the path of the gas through said shell, bubble plates disposed between successive catalyst beds, conduits coacting with said bubble plates to establish a continuous passageway for liquid throughout the shell, said conduits defining a bypass through said beds whereby said catalyst remains out of contact with said liquid, and means in the lower end of said shell for vaporizing liquid.

References Cited in the file of this patent

UNITED STATES PATENTS

| Number | Name | Date |
|---|---|---|
| 690,133 | Clemm et al. | Dec. 31, 1901 |
| 1,948,126 | Nisson | Feb. 20, 1934 |
| 2,049,027 | Schonberg et al. | July 28, 1936 |
| 2,107,714 | Rowland et al. | Feb. 8, 1938 |
| 2,198,795 | Titlestad | Apr. 30, 1940 |
| 2,256,622 | Murphree et al. | Sept. 23, 1941 |

OTHER REFERENCES

Perry, "Chemical Enginers' Handbook," pages 1456–1457.